(12) United States Patent
Thukral

(10) Patent No.: US 8,010,984 B2
(45) Date of Patent: Aug. 30, 2011

(54) REDIRECTION OF STREAMING CONTENT

(75) Inventor: Vivek Thukral, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1311 days.

(21) Appl. No.: 10/925,547

(22) Filed: Aug. 25, 2004

(65) Prior Publication Data
US 2006/0080453 A1 Apr. 13, 2006

(51) Int. Cl.
*H04N 7/173* (2006.01)
(52) U.S. Cl. ............. 725/86; 725/26; 725/27; 725/28; 725/29; 725/30; 705/51; 705/52; 705/53; 705/54; 726/10; 726/21
(58) Field of Classification Search ............. 725/86, 725/26–30; 705/51–54; 726/10, 21
See application file for complete search history.

(56) References Cited

U.S. PATENT DOCUMENTS

| | | | |
|---|---|---|---|
| 2002/0013772 A1* | 1/2002 | Peinado | 705/51 |
| 2003/0007646 A1* | 1/2003 | Hurst et al. | 380/285 |
| 2003/0018491 A1* | 1/2003 | Nakahara et al. | 705/1 |
| 2003/0097655 A1* | 5/2003 | Novak | 725/31 |
| 2003/0154242 A1* | 8/2003 | Hayes et al. | 709/203 |
| 2003/0229900 A1* | 12/2003 | Reisman | 725/87 |
| 2004/0039916 A1* | 2/2004 | Aldis et al. | 713/177 |
| 2005/0071278 A1* | 3/2005 | Simelius | 705/52 |
| 2005/0187879 A1* | 8/2005 | Zigmond et al. | 705/59 |
| 2005/0198510 A1* | 9/2005 | Robert et al. | 713/175 |
| 2006/0015580 A1* | 1/2006 | Gabriel et al. | 709/219 |
| 2006/0059105 A1* | 3/2006 | Ebihara et al. | 705/59 |

* cited by examiner

*Primary Examiner* — Scott Beliveau
*Assistant Examiner* — Mark P Stanley
(74) *Attorney, Agent, or Firm* — Lee & Hayes, PLLC

(57) ABSTRACT

Redirection of streaming content is described. In an implementation, a method includes receiving a request at a client from another client, wherein the request is to redirect on-demand content being streamed from a head end to the other client and includes a bookmark that specifies a point in time during an output of the on-demand content by the second client. A communication is formed for being communicated to the head end to cause redirection of the streaming of the on-demand content to the client corresponding to the point in time specified by the bookmark.

39 Claims, 5 Drawing Sheets

REDIRECTION OF STREAMING CONTENT

TECHNICAL FIELD

The present invention generally relates to the field of content and more particularly relates to redirection of streaming content.

BACKGROUND

There is an ever increasing variety of content that is available for streaming from a head end for output to a user. For example, a user may view traditional television programming broadcast over a network by using a client, such as a set-top box, a broadcast-enabled computer, and so on. The user, by utilizing the client, may also interact with on-demand content, such as by purchasing pay-per-view movies, ordering video-on-demand (VOD) content, recording content for later streaming from the head end when configured as a network digital video recorder (NDVR), and so on.

A VOD system, for instance, may stream content stored at the head end to the set-top box of the user. The VOD system may be utilized to provide a wide variety of content, such as movies, content available for purchase (e.g., subscription-based content, pay-per-use content, and so forth), television programs, sporting events, and so on. The user may initiate one or more trick modes by interacting with the set-top box, such as to pause, fast forward, rewind, and provide slow motion playback of the content. Thus, the trick modes may be utilized to control the streaming of the content from the head end to the set-top box.

A NDVR system, like a traditional DVR, may be utilized to record content of interest to a user. In this instance, however, the head end is configured to provide DVR functionality by including memory for storing content for later streaming over a network to the user. For example, the user may utilize a set-top box to communicate with the head end to cause a particular content item (e.g., a television program) to be recorded. To watch the recorded content item, the user may utilize the set-top box to communicate with the head end to cause streaming of the content from the head end to the client. The NDVR system may also support trick modes to enable the user to pause, fast forward, rewind, and provide slow motion playback of the content recorded at the head end.

To stream content for a particular user, a session is initiated between a corresponding client and the head end. For example, a user may initiate a VOD session by ordering a movie from a VOD system for being streamed to a set-top box. During the VOD session, the VOD system streams the movie to that particular set-top box for output to the user. Likewise, a particular user may cause recordation of a content item (e.g., a television program) by using the NDVR system. To watch the recorded television program, the user initiates a NDVR session that is particular to the client such that the recorded television program is streamed to that particular client. Therefore, in both of these instances, content is streamed for output to the particular user during a session initiated between the head end and a particular client corresponding to the particular user.

Traditional streaming of content during a session, however, is limited to a particular client that is utilized to access the content. When ordering a VOD (e.g., a movie), for instance, a session is initiated between a particular set-top box and a head end such that the movie is streamed to the particular set-top box. If the user wishes to view the movie utilizing a new client, however, a new session is initiated between the head end and the new client that is not aware of the previous session that was utilized to stream the content for output to the user. This lack of awareness may result in additional costs, such as to purchase conditional access rights to access the content utilizing the new client, in network bandwidth costs of networks utilized to stream the content, and so on. Additionally, due to the lack of awareness of the previous session between the user and the head end, even once the new session is initiated between the new client and the head end, the user is required to manually navigate through the content to continue output of the content at a corresponding point-in-time in the output of the previous session.

Accordingly, there is a continuing need for redirection of streaming content.

SUMMARY

Redirection of streaming content is described. In an implementation, a system is described which allows a user to redirect streaming content by transporting a session from one client to another client. Transporting the session may therefore be performed without ending the session or incurring additional costs as was previously encountered utilizing traditional techniques.

When a transport request is initiated by a user, for instance, streaming of a content item from the head end to an original client is paused. A request that includes a bookmark indicating a specific point-in-time in the duration of the output of the content (e.g., where the output of the content item was paused) is sent by the original client to a new client. The new client may acknowledge and accept the request. If the request is accepted, a new session is created between the new client and the head end based on the original session initiated between the original client and the head end. Additionally, digital rights management may also be performed to determine whether the new client is permitted to playback the content based on a license obtained by the original client. If so, the bookmark is utilized to locate the proper place in the stream to begin playback. Thus, the new session between the new client and the head end may inherit the properties of the original session between the original client and the head end, thereby transporting the session from the original client to the new client to redirect the streaming content to the new client.

BRIEF DESCRIPTION OF THE DRAWINGS

The same reference numbers are utilized in instances in the discussion to reference like structures and components.

DETAILED DESCRIPTION

Overview

Figure 1:
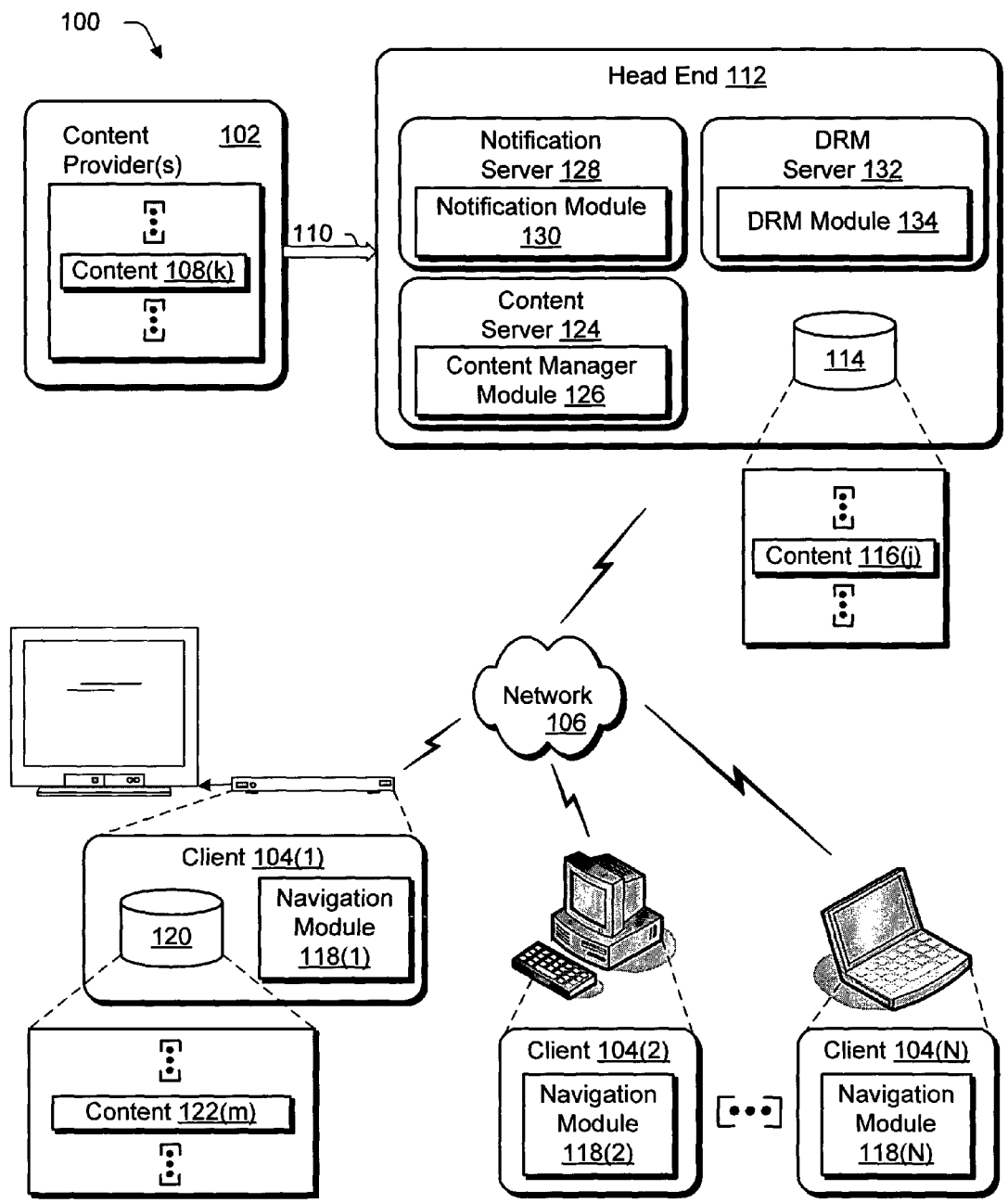
FIG. 1 is an illustration of an environment in an exemplary implementation that includes a content provider that is communicatively coupled to a plurality of clients over a network.

Redirection of streaming content is described. As previously mentioned, traditional sessions utilized to stream content to a user are limited to a particular client. Therefore, utilizing traditional techniques, when a user desires to redirect streamed content currently being output on a first client to a second client, the user is required to end the original session and then initiate a new session that is not "aware" of the original session. This lack of awareness may result in additional costs to the user to purchase conditional access rights to the content, manual navigation to a corresponding point in the output of the content in the new session, and so on.

In an implementation, the session is transported from the first client to the second client such that a session utilized to stream content to the second client is based at least in part on the original session. For example, a user may receive a stream of on-demand content from a head end on a first client, such as a movie that is streamed to a television that is located in the living room of the user's house. While watching the movie, the user may wish to continue to watch the movie on an information appliance located in the kitchen. Therefore, the user interacts with the television to select "information_appliance/kitchen" from a menu of available clients that are displayed in a user interface. The interaction causes a request to redirect the movie to be communicated from the television to the information appliance. The request may identify the originator of the request (e.g., the television) and includes a bookmark which identifies a particular point in the output of the movie at which the request was initiated. The interaction may also cause a pause in the streaming of the movie, such as to ensure that content is streamed once per session according to a "single use" license and such that the user does not miss a portion of the streaming movie when transitioning between devices.

The information appliance, in response to the request, communicates with the head end to begin streaming of the content. The head end may first provide a temporary license to enable the information appliance to begin viewing the movie and provides a stream of the movie that corresponds to the point indicated by the bookmark. While the movie is being streamed to the information appliance, the head end generates a regular license for the information appliance based on a regular license that was utilized to permit the movie to be streamed to the television. Thus, the regular license formed for the information appliance utilizes the previous regular license for the television such that the session is transported from the television to the information appliance. Additionally, the bookmark may be utilized such that the user has an uninterrupted viewing experience from the television to the information appliance. For example, the stream of the content to the information appliance may be paused at the point in the stream indicated by the bookmark so that the user can initiate output of the content at a corresponding point. In the following description, an environment and system which may implement redirection of streaming content will first be described. Procedures will then be described which may be implemented in the described exemplary environment as well as other environments.

Exemplary Environment

FIG. 1 is an illustration of an environment 100 in an exemplary implementation that includes a content provider 102 that is communicatively coupled to a plurality of clients 104 (1), 104(2), ..., 104(N) over a network 106. The plurality of clients 104(1)-104(N) may be configured in a variety of ways. For example, client 104(1) may be configured as a set-top box communicatively coupled to a display device as illustrated, client 104(2) is illustrated as a desktop personal computer (PC) that is capable of communicating over the network 106, and client 104(N) is illustrated as a notebook computer. The clients 104(1)-104(N) may also assume a variety of other configurations, such as a mobile station, an entertainment appliance, a wireless phone, a game console, and so forth. Each of the clients 104(1)-104(N) may range from a full resource device with substantial memory and processor resources (e.g., television enabled personal computers, television recorders equipped with hard disk) to a low-resource device with limited memory and/or processing resources (e.g., traditional set-top boxes). For purposes of the following discussion, the clients 104(1)-104(N) may also relate to a person and/or entity that operate the client. In other words, clients 104(1)-104(N) may describe a logical client that includes a user and/or a device.

The network 106 is illustrated as the Internet, and may include a variety of other networks. For example, the network 106 may include an intranet, a wired or wireless telephone network, a broadcast network which may include a backchannel to provide two-way communication, and so forth. Additionally, the network 106 may include a combination of networks. For instance, clients 104(1)-104(2) may communicate with each other over a local area network (LAN) and with the content provider 102 through a gateway router using a wide area network (WAN).

The content provider 102 includes a plurality of content 108(k), where "k" can be any integer from 1 to "K". The content 108(k) may include a variety of content for streaming to the plurality of clients 104(1)-104(n), such as television programming, pay-per-view movies, VOD, one or more results of remote application processing, and so on. The content 108(k) is communicated over a network 110 to a head end 112. The network 110 may be the same as or different from network 106. For example, the network 110 may be configured as a private subnet while the network 106 is configured as the Internet.

Content 108(k) communicated from the content provider 102 over the network 110 is received by the head end 112 and stored in a storage device 114 as content 116(j), where "j" can be any integer from "1" to "J". The content 116(j) may be the same as or different from the content 108(k) received from the content provider 102. The content 116(j), for instance, may include additional data for streaming to the client 104, may be compressed using one or more data compression techniques by the head end 112, and so forth.

The clients 104(1)-104(N) may be configured in a variety of ways to receive the content 116(j) over the network 106. As illustrated, client 104(1) is configured as a set-top box that is communicatively coupled to a display device. The client 104(1) includes hardware and software to transport and decrypt content 116(j) received from the head end 112 for rendering by the display device. Although a display device is shown, a variety of other output devices are also contemplated, such as speakers.

Each of the clients 104(1)-104(N) includes a respective navigation module 118(1)-118(N) that is executable thereon to control content streaming and playback on the respective clients 104(1)-104(N). For example, each of the navigation modules 118(1)-118(N) may be executable on a respective one of the clients 104(1)-104(N) to initiate a session to receive content 116(j) from the head end 112. Once a session is initiated, for instance, content 116(j) is streamed from the head end 112 to the client 104(1). In other words, a stream of the content 116(j) is provided "on-demand" by the head end 112 to the particular client 104(1) as opposed to a broadcast of the content which is simultaneously sent to each client, such as a broadcast of a television program. Therefore, in the environment 100 of FIG. 1, each of the clients 104(1)-104(N) may receive a dedicated stream of the content 116(j) from the head end 112 for that particular client.

The navigation modules 118(1)-118(N) may also be utilized to control content streaming through the use of one or more "trick modes". The trick modes may provide non-linear output of the content 116(j) (i.e., time shift the playback of the content 116(j)) such as pause, rewind, fast forward, slow motion playback, and the like.

Further, the navigation modules 118(1)-118(N) may be utilized to control local content output. For instance, client 104(1) may be configured as a digital video recorder (DVR) that includes a storage device 120 for storing content 116(j) communicated from the head end 112 as content 122(m), where "m" can be any integer from one to "M". Trick modes may also be implemented locally on the client 104(1). For example, during a pause, the client 104(1) may continue to record the content 116(j) in the storage device 120 as content 122(m). The client 104(1), through execution of the navigation module 118(1), may then playback the content 122(m) from the storage device 120, starting at the point in time the content 122(m) was paused, while continuing to record the currently-streamed content 116(j) in the storage device 120 that is received from the head end 112.

The navigation modules 118(1)-118(N) may also restore the content 122(m) stored in the storage and/or received from the head end 116(j) to the original encoded format as received from the content provider 102. For example, when the content 122(m) is recorded on the storage device 120 of client 104(1), the content 122(m) may be compressed. Therefore, when the navigation module 118(1) retrieves the content 122(m), the content 122(m) is decompressed for rendering by the display device.

As previously described, session are utilized to provide a dedicated stream of the content 116(j) to a particular one of the clients 104(1)-104(N). A session provided to receive the content 116(j) from the head end 112 by any one of the clients 104(1)-104(N) may be initiated in a variety of ways. For instance, client 104(1) may execute navigation module 118 (1) to retrieve content 116(j) that is streamed from the head end 112. The head end 112 is illustrated in FIG. 1 as including a content server 124 having a content manager module 126 that is executable thereon to retrieve content 116(j) from the storage device 114 for streaming over the network 106.

During the streaming of the content 116(j) to the client 104(1), the navigation module 118(1) is executable to form a request to redirect the streaming of the content 116(j) from the client 104(1) to another client, such as client 104(2). The request may be communicated by the client 104(1) in a variety of ways, such as by utilizing the head end 112. The head end 112, for instance, may include a notification server 128 having a notification module 130. The notification module 130 is executable to locate the client 104(2) based on the request received from client 104(1). The notification server 128 may then cause the request to be communicated to the client 104(2). In another implementation, the request is communicated directed between the clients 104(1), 104(2) without utilizing the head end 112, further discussion of which may be found in relation to FIG. 2.

The client 104(2), in response to the request, may determine if it has conditional access rights to output the content 116(j) identified in the request. If not, the client 104(2) may execute the navigation module 118(2) to obtain the conditional access rights through communication with a digital rights management (DRM) server 132 having a DRM module 134. The DRM module 134 is executable on the DRM server 132 to determine and provide conditional access rights, such as by accepting and processing billing information regarding the content 116(j). Additionally, the DRM module 134 may be executed to provide temporary and regular licenses to the client 104(2) to provide access to the content 116(j). For example, the DRM module 134 may provide a temporary license as previously described for use by the client 104(2) while a regular license is generated for the client 104(2).

Once the conditional access rights are obtained through receipt of the temporary license, the content server 124 executes the content manager module 126 to stream the content 116(j) to the client 104(2). Thus, the client 104(2) may be given access to the content 116(j) without waiting for the regular license to be generated. Further discussion of the temporary license may be found in relation to FIG. 3 and generation of the regular license may be found in relation to FIG. 4. Additionally, the content server 124 may stream the content 116(j) to the client 104(2) such that an output of the content 116(j) at the client 104(2) matches the point at which the content 116(j) was previously output by client 104(1) to provide a continuous output experience.

Figure 2:
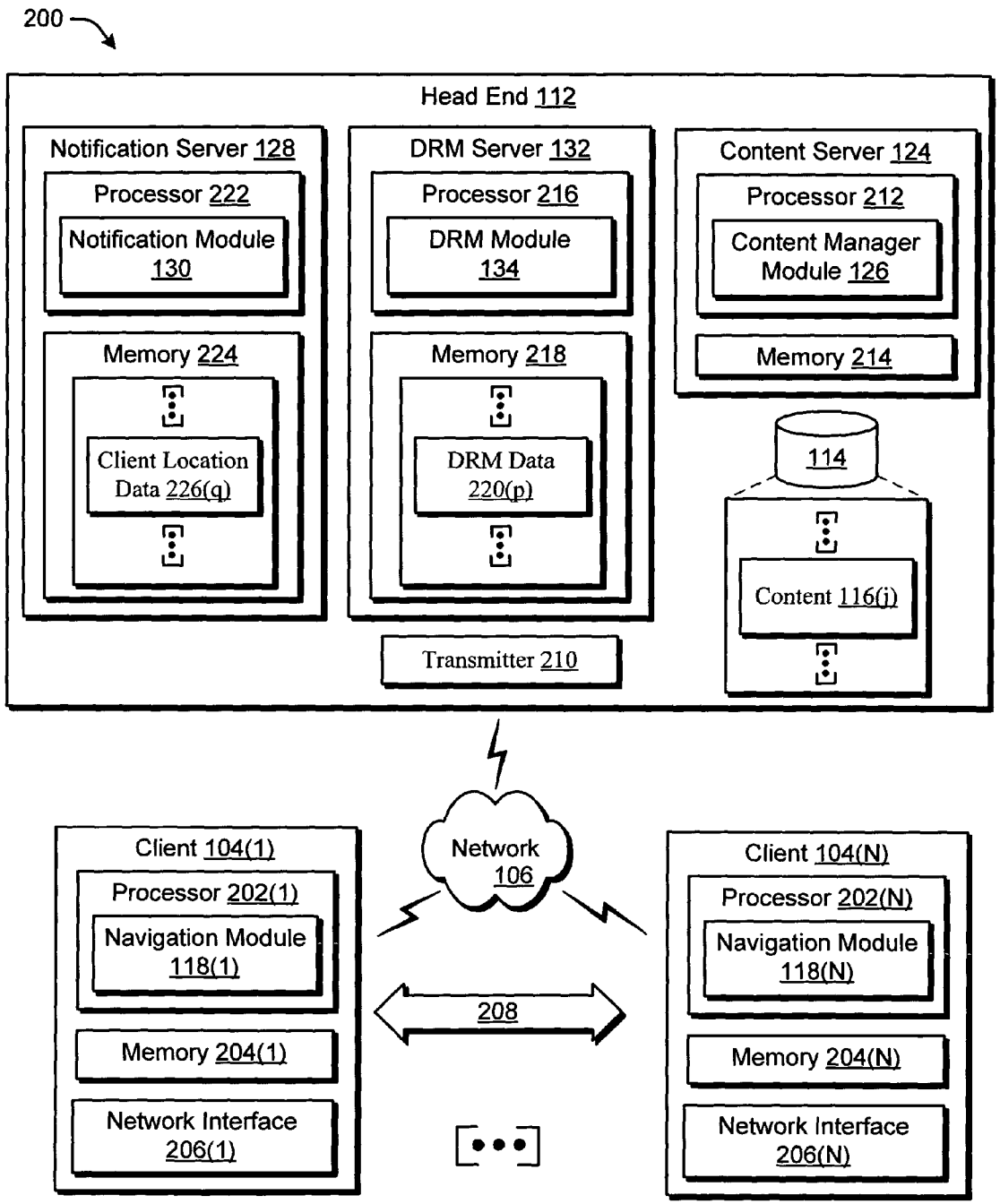
FIG. 2 is an illustration of a system showing exemplary implementations of the plurality of clients, a notification server, a DRM server, and a content server of FIG. 1 in greater detail.

FIG. 2 is an illustration of a system 200 showing exemplary implementations of the plurality of clients 104(1)-104(N), the notification server 128, the DRM server 132, and the content server 124 of FIG. 1 in greater detail. Each of the clients 104(1)-104(N) includes a respective processor 202(1)-202 (N) and a respective memory 204(1)-204(N). The navigation modules 118(1)-118(N) are illustrated as being executed on the respective processors 202(1)-202(N) and are storable in the respective memories 204(1)-204(N).

Each of the clients 104(1)-104(N) is also illustrated as including a respective one of a plurality of network interface devices 206(1)-206(N) which are configured to provide a network connection. For instance, the network interface devices 206(1)-206(N) may be configured as tuners to receive a stream of content 116(j) from over the network 106. In another instance, the network interface devices 206(1)-206 (N) are configured to communicatively couple the plurality of clients 104(1)-104(N), one to another, over a LAN 208. For example, each of the clients 104(1)-104(N) may be included in a user's home and be communicatively coupled over a wired or wireless Ethernet connection.

The navigation modules 118(1)-118(N), when executed on the respective processors 202(1)-202(N), may send a request via the network 106 to the content server 124 to request content 116(j) for streaming over the network 106, such as on-demand content as previously described. As previously described, the network 106 may support two-way communication between the content server 124 and the clients 104(1)-104(N). Additionally, the network 106 can be any type of network, using any type of network topology and any network communication protocol, and can be represented or otherwise implemented as a combination of two or more networks including, for example, microwave, satellite, and/or data networks, such as the Internet. Furthermore, the network 106 may be capable of transmitting and receiving wired or wireless media using any broadcast format or broadcast protocol. Although illustrated separately as a double-headed arrow in FIG. 2, the network 106 may also include the LAN 208 as previously described.

The head end 112 includes a transmitter 210. The transmitter 210 provides distribution (e.g., streaming) of the content 116(j) from the storage device 114 across the network 106 to the client 104. The content server 124 includes a processor 212, memory 214, and the content manager module 126, which is illustrated as being executed on the processor 212 and is storable in memory 214. The content manager module 126, when executed, controls distribution of the content 116(j) over the network 106.

The navigation module 118(1) may communicate with the content manager module 126 to provide trick modes (e.g., non-linear playback, such as time shifting) for the playback of the content 116(j). For example, the client 104 may communicate with the content server 124 through execution of the respective navigation module 118(1) and the content manager module 126 to pause, fast forward, rewind, playback in "slow motion," and so forth. In this instance, the client 104(1) controls the content server 124 to regulate content 116(j) playback through the use of commands that are communicated over the network 106 through execution of the navigation module 118(1).

In a further implementation, the client 104(1) may execute the navigation module 118(1) to cause recordation of the content 116(j) at the content server 124.

For example, the navigation module 118(1) may form a request that is communicated to the content server 124 over the network 106 to record content 108(k) of FIG. 1 communicated to the content server 124 from the content provider 102. The content manager module 126, in response to the request, is executed to record the requested content such that the content manager module 126 operates as a network digital video recorder (NDVR). Thus, through execution of the navigation module 118(1), the client 104(1) may receive content 116(j) that is stored remotely over the network 106, and may even control the recordation and streaming of the remotely stored content 116(j) to the client 104(1).

The head end 112 is illustrated as including the DRM server 132 which is utilized to provide digital rights management. For example, to determine whether the client 104(1) is permitted to receive the content 116(j), the content manager module 126 may pass a request for the content 116(j) received at the content server 124 from the client 104(1) for processing through execution of the DRM module 134. The DRM module 134 is illustrated as being executed on the processor 216 and is storable in memory 218. For example, the DRM module 134 may be executed to determine whether the client 104(1) has obtained conditional access rights to the content 116(j), obtain billing information from the client 104(1), and so on. To determine whether the client 104(1) has conditional access rights to the content 116(j), the DRM module 134 is executed to query a plurality of DRM data 220(p), where "p" can be any integer from one to "P".

The DRM data 220(p) may include a variety of information, such as different subscription models and corresponding costs, purchasing information, information regarding regular and/or temporary licenses obtained by respective ones of the plurality of clients 104(1)-104(N), and so on. The DRM module 134, for instance, may generate temporary and regular licenses (not shown here) utilizing the DRM data 220(p) which are then utilized by the clients 104(1)-104(N) to obtain (e.g., access) content 116(j) from the content manager module 126. Further discussion of licenses may be found in relation to FIGS. 3 and 4.

The head end 112 is also illustrated as including a notification server 128 and notification module 130. The notification module 130 is illustrated as being executed on a processor 222 and is storable in memory 224. The notification module 130, when executed, may be utilized to communicatively couple the plurality of clients 104(1)-104(N), one to another. For instance, client 104(1) may not be aware of the network location (e.g., a network address) of client 104(N). Therefore, to communicate a request to redirect content 116(j), the client 104(1) may first communicate that request to the head end 112, and more particularly the notification server 128. The notification module 130 is executed in response to the request to locate the client 104(N) using one or more of a plurality of client location data 226(q), where "q" can be any integer from one to "Q". For example, the client location data 226(q) may be utilized to match an alias of the client 104(N) (e.g., a memorable name) with an IP address to locate the client 104(N). A variety of other data may be stored in the client location data 226(q) such that the notification module 130 may locate a client over the network 106. Additionally, the client location data 226(q) may be obtained by the notification module 130 in a variety of ways, such as by a communication broadcast by each of the clients 104(1)-104(N) when joining the network 106, querying (e.g., pinging) network locations, responses to request communicated by the notification module 130 over the network 106 for clients to identify themselves, dynamically discovered via universal plug-and-play (UPnP), and so on. In another implementation, each of the clients 104(1)-104(N) may obtain client location data in a similar way as described for the notification module 130 such that the notification server 128 and notification module 130 are not utilized to communicatively couple the clients 104(1)-104(N). For instance, client 104(1) may execute a notification module to receive a communication from other clients which provides the respective client network location, ping the other clients of the network, and so on.

Although the components (e.g., server, modules, transmitters, etc.) of system 200 are illustrated separately in FIG. 2, in alternate implementations, the notification server 128, DRM server 132, content server 124, storage device 114, and transmitter 210 may be combined, implemented as one or more distinct components, locally as part of the head end 112 and/or content provider 102 of FIG. 1, or remotely as part of another distinct system.

Exemplary Procedures

The following discussion describes redirection of streaming content that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3:
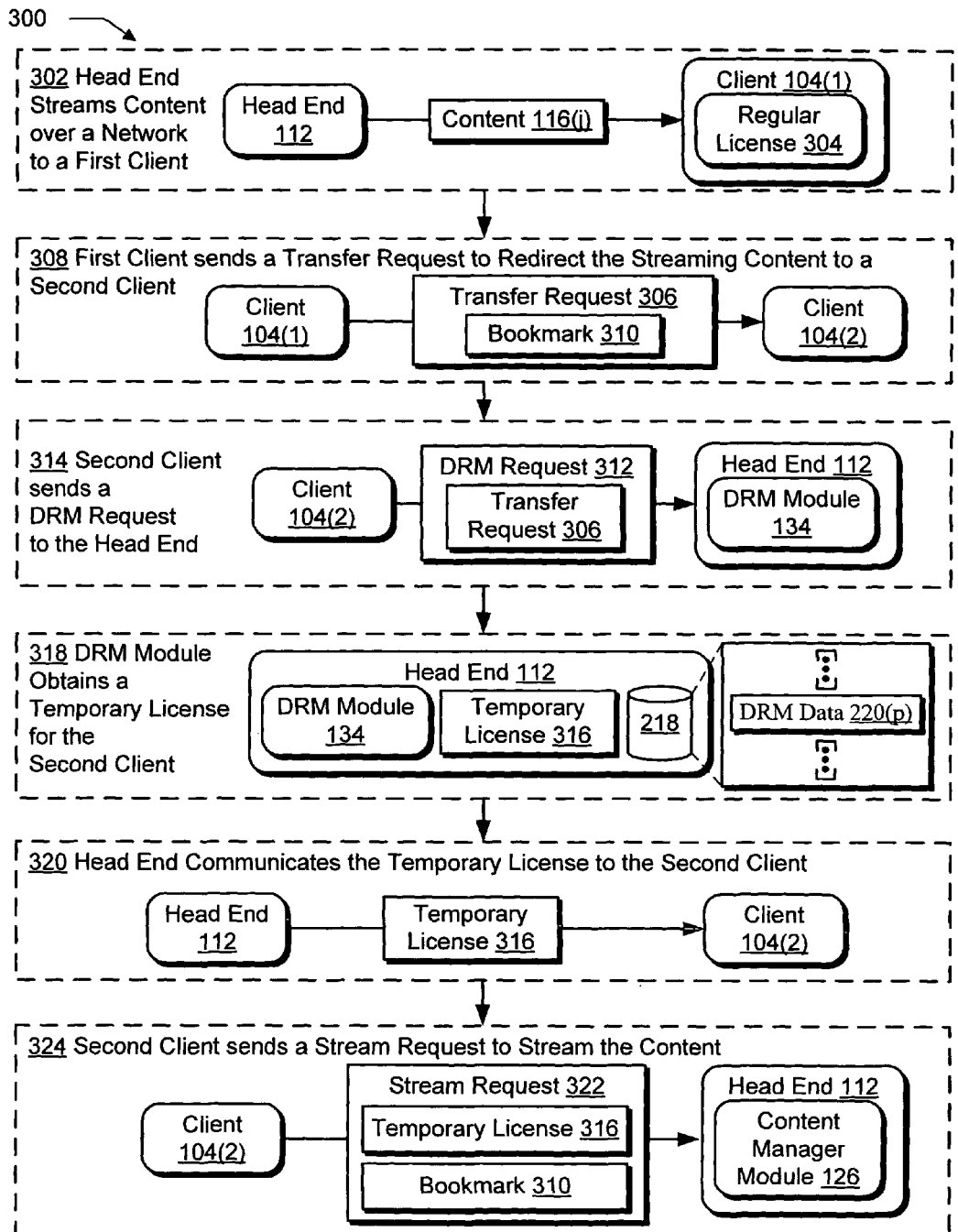
FIG. 3 is a flow diagram depicting a procedure in an exemplary implementation in which a temporary license is provided in response to a request to redirect streaming content from a first client to a second client of FIG. 2.

FIG. 3 is a flow diagram depicting a procedure 300 in an exemplary implementation in which a temporary license is provided in response to a request to redirect streaming data from a first client 104(1) to a second client 104(2). Initially, the first client 104(1) receives content 116(j) that is streamed from the head end 112 (block 302). The content 116(j) in this implementation is on-demand content that is streamed to the first client 104(1) during a session that was initiated between the head end 112 and the client 104(1). For example, the head end 112 may require billing information from the client 104(1) so that the client 104(1) may obtain conditional access rights to the content 116(j). In response to the billing information, the DRM module 134 of FIG. 2 is executed to provide a regular license 304 that specifies the conditional access rights of the client 104(1), such as a permitted usage term, limitations on which devices may be utilized to output the content, and so on. Additionally, the regular license 304 may include a decryption key which allows the client 104(1) to decrypt the content 116(j).

During the streaming of the content 116(j) to the first client 104(1) (block 302), the first client sends a transfer request 306 to redirect the streaming content to a second client 104(2) (block 308). A user, for instance, may desire to switch to a different room having the second client 104(2). The transfer request 306 includes a bookmark 310 which indicates a particular point in the output of the content 116(*j*) by the client 104(1). For example, the bookmark 310 may indicate a time elapsed in the output of the content 116(*j*), a current chapter, time remaining in the output of the content 116(*j*), a particular frame of the content 116(*j*), and so on.

In response to the transfer request 306 (block 308), the second client 104(2) forms and sends a DRM request 312 to the head end 112 (block 314). The DRM request 312 is illustrated as including the transfer request 306 to indicate that the DRM request 312 includes information obtained from the transfer request 306, such as an identifier of the content 116(*j*) (e.g., the content title), a network location of the head end 112 that streams the content 116(*j*), and so on. The DRM request 312 is for processing by a DRM module 134 to determine if the client 104(2) has conditional access rights to the content 116(*j*).

During the processing of the DRM request 312, the DRM module 134 first obtains a temporary license 316 for the second client 104(2) (block 318). The temporary license 316 may be obtained in a variety of ways. For example, the DRM module 134, based on the DRM request 312, may generate a temporary license 316 from the DRM data 220(*p*) for the second client 104(2). The temporary license 316 in this example provides conditional access rights to a portion of the content 116(*j*), but not every portion of the content 116(*j*). For instance, the DRM request 312 may supply an identifier of a particular content item 116(*j*) included in the transfer request 306. The DRM module 134, when executed, may locate DRM data 220(*p*) corresponding to the particular content item 116 (*j*) to generate the temporary license 316 which enables the second client 104(2) to decrypt a portion of the content 116(*j*). The temporary license, for example, may include time constraints such that the second client 104(2) may only access the content 116(*j*) during a particular period of time, may include conditional access rights to a particular chapter of the content 116(*j*), and so on.

The head end 112 then communicates the temporary license 316 to the second client 104(2) (block 320). For instance, the head end 112 may stream the temporary license 316 to the second client 104(2), broadcast the temporary license 316 in a video blanking interval (VBI), email the temporary license 316, and so on. Upon receipt of the temporary license 316, the second client 104(2) then forms and communicates a stream request 322 to the head end 112 to stream the content 116(*j*) (block 324). The stream request 322 in this implementation is communicated to the content manager module 126 of the head end 112 to cause the steaming of the content 116(*j*) to the second client 104(2). The stream request 322 is illustrated as including the bookmark 310 so that the content manager module 126 streams the content 116(*j*) to the second client 104(2) to provide an uninterrupted viewing experience that continues the previous streaming of the content 116(*j*) to the first client 104(1) (block 302).

The stream request 322 is also illustrated as including the temporary license 316 identifier such that the content manager module 126 may determine that the second client 104(2) has obtained conditional access rights to the content 116(*j*), i.e., that the client has the temporary license 216 itself. In another implementation, the content manager module 126 obtains such information from a server module (e.g., a DRM module 134) which provided the temporary license. In a further implementation, the temporary license 316 is utilized by the second client 104(2) to decrypt the content 116(*j*), and therefore the temporary license 316 is not communicated to the head end 112, but rather it utilized to provide access to the encrypted content 116(*j*) at the second client 104(2).

As shown in FIG. 3, the temporary license 316 may be utilized to provide conditional access rights to the second client 104(2) for accessing a portion of the content 116(*j*). Thus, the second client 104(2) may output the content 116(*j*) without waiting for a regular license to be provided that enables the second client 104(2) to access the content 116(*j*) in its entirety. The temporary license 316 is utilized to protect the content 116(*j*) from unauthorized use by providing conditional access rights to a portion of the content 116(*j*), yet the second client 104(2) is permitted to access the content 116(*j*) without waiting for a regular license to be processed. Further discussion of the generation of a regular license is described in relation to the following figure.

Figure 4:
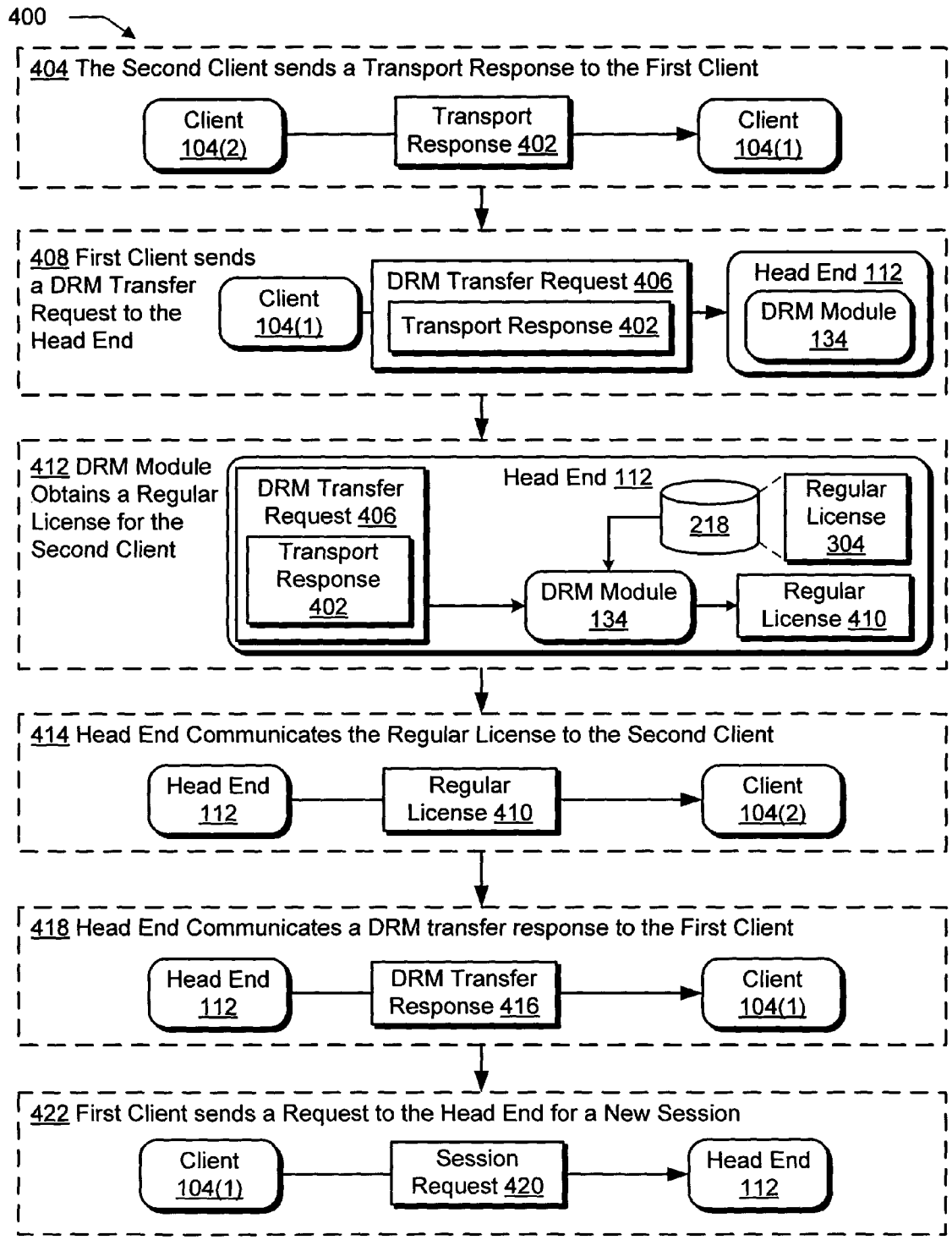
FIG. 4 is a flow diagram depicting a procedure in an exemplary implementation in which a regular license is obtained while the second client outputs content streamed in accordance with a temporary license of FIG. 3.

FIG. 4 is a flow diagram depicting a procedure 400 in an exemplary implementation in which a regular license is obtained while the second client 104(2) outputs content 116 (*j*) streamed in accordance with a temporary license 316 of FIG. 3. Continuing with the previous implementation described in relation to FIG. 3, the second client 104(2) sends a transport response 402 to the first client 104(1) to request transfer of the first client's 104(1) session with the head end 112 (block 404). The transport response 402 may also be used to indicate that the second client 104(2) has accepted the transfer request 306 of FIG. 3 and is configured to receive content 116(*j*), at least temporarily, that is streamed from the head end 112.

Upon receipt of the transfer response 402 (block 404), the first client 104(1) sends a DRM transfer request 406 to the head end 112 for processing by the DRM module 134 (block 408). The DRM transfer request 406 is illustrated as including the transport response 402 in this instance to indicate that the DRM transfer request 406 includes data taken from the transport response 402. For example, the data may include an identifier provided in the transport response 402 to indicate that streaming of the content 116(*j*) has begun for the second client 104(2), a special token provided to the second client 104(2) from the head end 112 which is utilized to authenticate the transport response 402 and protect against attack, and so forth.

The head end 112, in response to the DRM transfer request 406 (block 408), obtains a regular license 410 for the second client 104(2) (block 412). The regular license 410 may be obtained in a variety of ways. For example, the regular license 410 may be a converted form of a regular license 304 which was utilized to grant conditional access rights to the first client 104(1). The DRM module 134, for instance, may obtain DRM data 220(*p*) of FIG. 2 from the memory 218 of the DRM server 132 which describes the regular license 304 of the first client 104(1). The DRM module 134 may then be executed to convert the regular license 304 for use by the second client 104(2), such as to change regular license 304 from specifying the first client 104(1) to specifying the second client 104(2), provide a new decryption key that is specific to the second client 104(2), and so on. Thus, the regular license 410 obtained by the DRM module 134 may be based at least in part on the regular license 304 utilized by the first client 104(1) to access the content 116(*j*).

Additionally, the DRM module 134 may obtain purchasing information from the second client 104(2). For example, the regular license 304 may specify that the license may be transferred to another client for a fee. Therefore, the DRM module 134 may be executed to collect billing information from the second client 104(2) so that the conditional access rights are granted for the second client 104(2).

The DRM module 134, when executed, may also utilize the DRM transfer request 406 to generate the regular license 410. For example, the DRM transfer request 406 may include data from the transport response 402 which indicates that the second client 104(2) accepts transfer of the regular license 304. Thus, the DRM transfer request 406 may be utilized to verify the transfer of the conditional access rights to the client 104(2). In another example, the DRM module 134 obtains the regular license 410 from memory 218 by selecting one or more of a plurality of preconfigured regular licenses.

The head end 112 then communicates the regular license 410 that was obtained to the second client 104(2) (block 414). The regular license 410 may therefore be utilized by the second client 104(2) to provide conditional access rights to a portion of the content 116(j) that was not accessible utilizing the temporary license 316 of block 320 of FIG. 3. For example, the regular license 410 may include decryption keys which enable the second client 104(2) to decrypt additional portions of the content 116(j) that could not be decrypted using the temporary license 316. The second client 104(2) may therefore replace the temporary license 316 with the regular license 410 for continued access to the stream of content 116(j).

The head end 112 also communicates a DRM transfer response 416 to the first client 104(1) (block 418) which indicates that the session to stream the content 116(j) has been transferred to the second client 104(2). Additionally, the DRM transfer response 416 may be utilized to indicate that the streaming of the content 116(j) has been redirected to the second client 104(2) because the session has been transferred. Thus, the initial session utilized to stream the content 116(j) from the head end 112 to the first client 104(1) is transferred to the second client 104(2).

To receive additional content, the first client 104(1) may send a session request 420 to the head end 112 to initiate a new session (block 422). In another implementation, the head end 112 may automatically begin streaming of content from a previous session that was initiated between the first client 104(1) and the head end 112, such as a previous television channel streamed to the first client 104(1), a previous VOD, and so on.

Thus, the temporary license 316 was provided in FIG. 3 to enable the second client 104(2) to access the content 116(j) while the regular license 410 was obtained for the second client 104(2) in FIG. 4. The regular license 410 was based at least in part on the regular license 304 utilized by the first client 104(1) to access the content 116(j), thereby resulting in a transferring of the session from the first client 104(1) to the second client 104(2).

Figure 5:
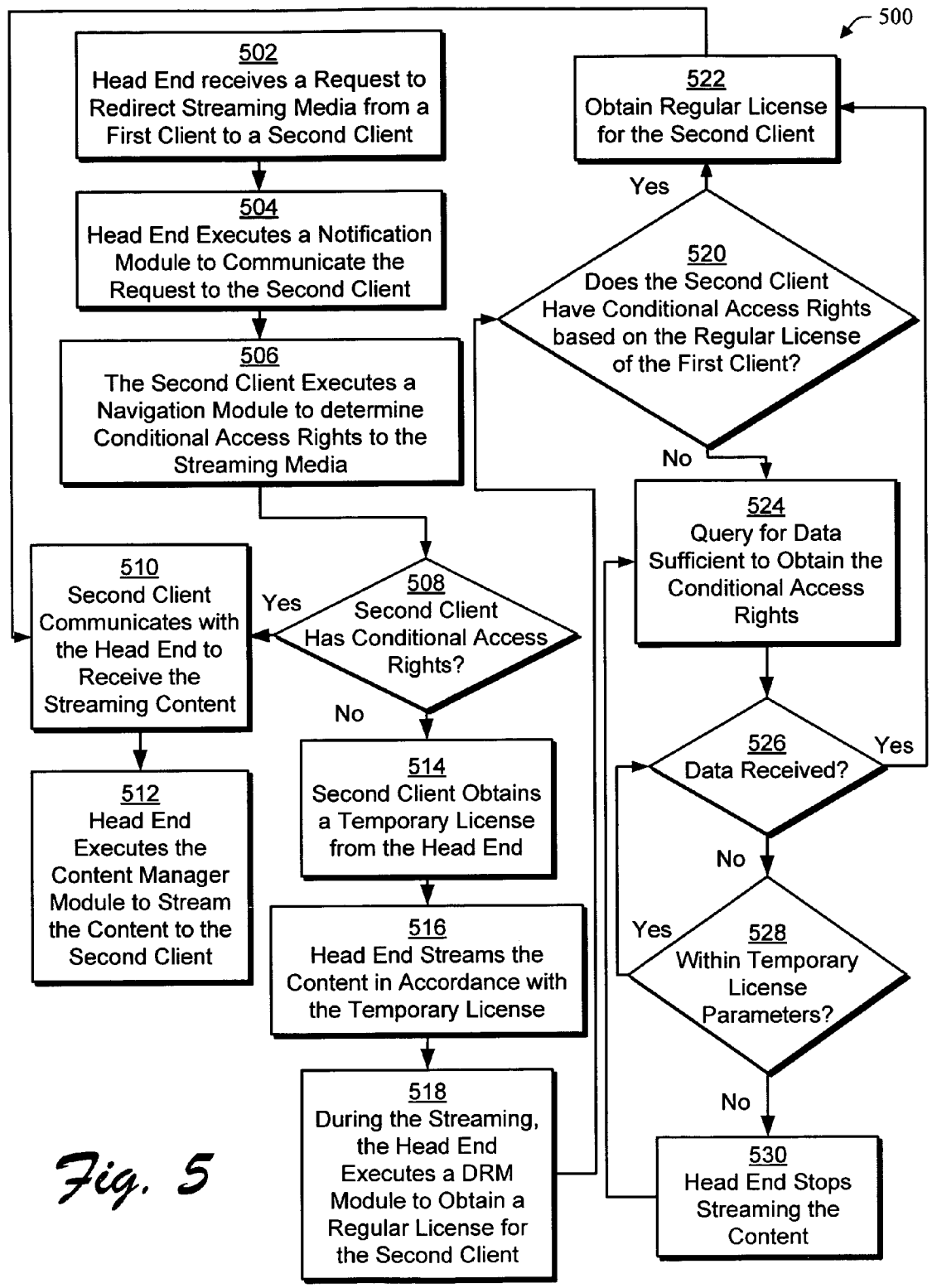
FIG. 5 is a flow diagram depicting a procedure in an exemplary implementation in which a regular license is obtained for a second client based at least in part on a regular license previously provided for permitting a first client to access content.

FIG. 5 is a flow diagram depicting a procedure 500 in an exemplary implementation in which a regular license is obtained for a second client based at least in part on a regular license previously provided for permitting a first client to access content. In the following description, reference will be made to both the flow diagram of FIG. 5 and the environment 100 of FIG. 1 and therefore reference numbers are utilized which are found in either figure.

A head end 112 receives a request to redirect streaming media 116(j) from a first client 104(1) to a second client 104(2) (block 502). The request in this instance is communicated to the head end 112 from the first client 104(1) because the first client 104(1) is not directly communicative coupled to the second client 104(2). For example, as described in relation to FIG. 2, the first and second clients 104(1), 104(2) may be communicatively coupled over an Ethernet connection, such as in a user's house, and therefore may communicate directly without utilizing the head end 112. In this example, however, the first client 104(1) is indirectly communicatively coupled to the second client 104(2) via the head end 112, and more particularly the notification server 128 of the head end 112. Therefore, the notification server 128 may be utilized to route requests and responses between the clients 104(1), 104(2).

The head end 112, in response to the request, executes a notification module 130 to communicate the request to the second client 104(2) (block 504). For instance, the notification module 130 may locate a network address for the second client 104(2) and forward the request to the second client 104(2) over the network 106. The second client 104(2), in response to the request, executes a navigation module 118(2) to determine if it has conditional access rights to the streaming content 116(j) identified in the request (block 506). If the second client 104(2) has conditional access rights (decision block 508) to the content 116(j), the second client 104(2) communicates with the head end 112 to receive the streaming content 116(j) (block 510). For example, use may have previously obtained a regular license for each client (e.g., clients 104(1), 104(2)) owned by the user such that each client 104(1), 104(2) may access content streamed from the head end 112. The head end 112 then executes the content manager module 126 to stream the content 116(j) from the storage device 114 over the network 106 to the client 104(2) (block 512).

If the second client 104(2) does not have conditional access rights to the content 116(j) (decision block 508), the second client 104(2) obtains a temporary license from the head end 112 (block 514). The second client 104(2) may obtain the temporary license in a variety of ways, examples of which were previously described in relation to FIG. 3. The head end 112 then streams the content 116(j) in accordance with the temporary license to the client 104(2) over the network 106 (block 516).

During the streaming of the content 116(j), the head end executes the DRM module 134 to obtain a regular license for the second client 104(2) (block 518). The regular license may be utilized to provide conditional access rights in addition to those specified in the temporary license, such as to an additional portion(s) of content, for an extended period of time, and so on. A determination is then made through execution of the DRM module as to whether the second client 104(2) has conditional access rights to the content 116(j) based on a regular license granted to the first client 104(1) (decision block 520). For example, the regular license provided to the first client 104(1) to accept streaming content 116(j) may be active for a predetermined period of time, but is not limited to a particular client for outputting the content. If the second client 104(2) has conditional access rights based on the regular license to the first client 104(1) (decision block 520), a regular license is obtained for the second client 104(2) based at least in part on the regular license to the first client 104(1) (block 522).

If the second client 104(2) cannot obtain conditional access rights based on a regular license to the first client (decision block 520), the DRM module 134 queries the second client 104(2) for data which is sufficient to obtain the conditional access rights (block 524). For example, the DRM module 134 may obtain user information, billing information, and so on. The DRM module 134 may then periodically determine if data has been received which is sufficient to provide the conditional access rights (decision block 526). If so, the DRM module 134 obtains a regular license for the second client 104(2) (block 522). If not, the DRM module 134 also determines whether the content 116(j) is still being streamed in accordance with the temporary license (decision block 528).

If not, the head end stops streaming the content 116(j) to the second client 104(2) (block 530). If so, the head end 112 again queries for data sufficient to obtain the conditional access rights (block 526). Thus, the DRM module 134 may continually attempt to gain sufficient data to obtain the conditional access rights for the content 116(j) (i.e., a regular license) yet still operate in compliance with the temporary license.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
providing, by a head end, during streaming of a content item to a first client, a temporary license in response to a request to redirect streaming of the content item from the first client to a second client, wherein the temporary license grants the second client a conditional access right to a first portion of the content item;
receiving, by the head end, from the second client, a request to stream the content item to the second client, the request including the temporary license;
initiating streaming of the first portion of the content item to the second client based on the temporary license for output at the second client prior to granting of a regular license; and
during the streaming of the first portion of the content item to the second client based on the temporary license, supplying, by the head end, the regular license for the second client that specifies a conditional access right to a second portion of the content item that is not specified in the temporary license.

2. A method as described in claim 1, wherein the content item is on-demand content.

3. A method as described in claim 2, wherein the content item is selected from the group consisting of:
video-on demand (VOD) content;
pay-per-view (PPV) content; and
network digital video recorder (DVR) content.

4. A method as described in claim 1, wherein:
the supplying the regular license by the head end is in response to a digital rights transfer request received from the first client following initiation of streaming to the second client;
the digital rights transfer request received from the first client includes a response and a token that the first client received from the second client following the initiation of the streaming to the second client, the token having been received by the second client from the head end; and
the token is used to authenticate the response from the second client.

5. A method as described in claim 1, wherein the conditional access right included in the regular license is based at least in part on a regular license to the content item for the first client.

6. A method as described in claim 1, wherein the request to redirect the streaming of the content item is received from the second client following a pause in streaming of the content item to the first client.

7. A method as described in claim 6, wherein the request to redirect the streaming of the content item is performed in response to another request received at the second client from the first client.

8. A method as described in claim 1, further comprising communicating the request to redirect the streaming of the content item from the second client to the head end, wherein:
the communicating is performed in response to another request received at the second client from the first client; and
the other request is communicated directly between the first and second clients.

9. A method as described in claim 1, further comprising communicating the request to redirect the streaming of the content item from the second client to the head end, wherein:
the communicating is performed in response to another request received at the second client from the first client; and
the other request is communicated between the first and second clients by utilizing the head end.

10. One or more computer readable media, wherein the media is not a signal, comprising computer executable instructions that, when executed on a computer, direct the computer to perform the method of claim 1.

11. A method comprising:
receiving a request at a second client from a first client, the first client having been receiving streaming of an on-demand content item from a head end, wherein the request is for redirecting the streaming of the on-demand content item to the second client, and includes a bookmark indicating a point in delivery of the on-demand content item;
as a result of receiving the request from the first client, forming, by the second client, a communication to the head end to cause redirection of the streaming of the on-demand content item to the second client corresponding to the point-in-time specified by the bookmark;
sending the communication to the head end, wherein, as a result of receiving the communication, the head end provides a temporary license for the second client;
receiving, by the second client, the temporary license in response to the communication, the temporary license including a conditional access right to at least one of:
a first portion of the on-demand content item that is less than an entirety of the on-demand content item, or
a first portion of the on-demand content item corresponding to a particular chapter of the on-demand content item;
in response to receiving the temporary license, sending, by the second client, to the head end, a request to stream the on-demand content item to the second client, the request to stream the on-demand content item including the temporary license;
receiving and outputting, by the second client, streaming of the first portion of the on-demand content item prior to receiving a regular license for the on-demand content item, the streaming commencing at the point indicated by the bookmark;
during the streaming of the first portion of the on-demand content item, receiving, by the second client, a regular license that specifies a conditional access right to a second portion of the on-demand content item that is not specified in the temporary license.

12. A method as described in claim 11, wherein the conditional access right included in the regular license is based at least in part on a regular license to the on-demand content item for the first client.

13. One or more computer readable media, wherein the media is not a signal, comprising computer executable instructions that, when executed on a computer, direct the computer to perform the method of claim 11.

14. One or more computer readable media, wherein the media is not a signal, comprising computer executable instructions that, when executed on a computer, direct the computer to perform operations comprising:
  upon receipt of a first request, communicated from a first client implemented on another computer, to redirect a content item streamed to the other computer, forming, by a second client, a second request for communication to a head end to cause redirection of the streaming content item from the first client to the second client;
  receiving, by the second client, a temporary license from the head end, the temporary license supplied in response to the second request for receipt of a first portion of the streaming content item from the head end;
  receiving, by the second client, the streaming content item redirected from the head end in response to the second request in accordance with the temporary license, the receiving the streaming content item commencing prior to receipt of a regular license for the content item that specifies a conditional access right to a second portion of the content item that is not specified in the temporary license; and
  during the streaming of the first portion of the content item, receiving, by the second client, the regular license specifying the conditional access right to the second portion of the content item.

15. One or more computer readable media as described in claim 14, wherein the content item is on-demand content.

16. One or more computer readable media as described in claim 14, wherein the second request includes a bookmark specifying a particular point in an output of the streaming content item corresponding to a point at which the streaming of the content item was paused at the first client.

17. One or more computer readable media as described in claim 16, wherein:
  the streaming content item is received from the head end according to the temporary license supplied in response to the second request; and
  the streaming content item received according to the temporary license is output by the second client for viewing by a user commencing at the point indicated by the bookmark.

18. One or more computer readable media as described in claim 14, wherein the computer executable instructions further direct the computer to receive the regular license from the head end during the receipt of the streaming content item corresponding to the first portion, the regular license enabling the second client to decrypt a remaining portion of the content item.

19. One or more computer readable media as described in claim 14, wherein the computer executable instructions further direct the computer to receive the regular license from the head end during the receipt of the streaming content item that includes a conditional access right based at least in part on a regular license to the content item for the other client.

20. One or more computer readable media as described in claim 14, wherein:
  following receipt of the temporary license, the second client sends a response and a token to the first client, the token having been received from the head end; and
  following receipt of the response and the token from the second client, the first client sends a digital rights transfer request to the head end including the response and the token from the second client for use in obtaining the regular license for the second client; and
  the token is used to authenticate the response from the second client.

21. One or more computer readable media as described in claim 14, wherein:
  the computer executable instructions further direct the computer to receive the regular license from the head end during the receipt of the streaming content item; and
  the regular license includes a conditional access right that is not included in the temporary license.

22. A head end comprising:
  a processor;
  a transmitter that is communicatively coupled to the processor and configured to stream a content item over a network; and
  memory that is communicatively coupled to the processor and is configured to maintain the content item and one or more modules that are executable on the processor to perform operations comprising:
    establishing a session for streaming the content item to a first device based on a regular license held by the first device to receive the streaming of the content item;
    receiving a request to transfer the session of the first device with the head end to a second device, so as to redirect the content item streaming to the first device, such that by transfer of the session, the content item is streamed to the second device;
    in response to the request to transfer the session, providing a temporary license to the second device over the network, the temporary license including a conditional access right for the second device to output a first portion of the content item;
    based on the temporary license, transferring the session from the first device to the second device and streaming the first portion of the content item to the second device; and
    during the streaming of the first portion of the content item to the second device based on the temporary license, supplying a regular license for the second device, such that the regular license provides the second device with at least one additional conditional access right to a remaining portion of the content item that is not specified in the temporary license.

23. A head end as described in claim 22, wherein:
  following receipt of the temporary license, the second device sends a response and a token to the first device, the token having been received from the head end; and
  the head end supplies the regular license to the second device based on a digital rights transfer request received by the head end from the first device, the digital rights transfer request including the response and the token received by the first device from the second device, wherein the token is used to authenticate the response from the second device.

24. A head end as described in claim 22, wherein the at least one additional conditional access right is based at least in part on the regular license to the content item held by the first device.

25. A head end as described in claim 22, wherein the content item is selected from the group consisting of:
  video-on demand (VOD) content;
  pay-per-view (PPV) content; and
  network digital video recorder (DVR) content.

26. A head end as described in claim 22, wherein the content item is on-demand content.

27. A head end as described in claim 22, wherein the request is communicated from the second device.

28. A head end as described in claim 22, wherein the request is communicated from the second device in response to another request received at the second device from the first device.

29. A head end as described in claim 22, wherein:
the request is communicated from the second device in response to another request received at the second device from the first device; and
the other request is communicated directly between the first device and the second device.

30. A head end as described in claim 22, wherein:
the request is communicated from the second device in response to another request received at the second device from the first device; and
the other request is communicated between the first device and the second device by utilizing the head end.

31. A system comprising:
a head end having one or more modules that are executable thereon to stream a content item over a network;
a first client having one or more modules that are executable thereon to perform operations comprising:
receiving the streamed content item from over the network; and
forming a first request that specifies redirection of the streamed content item, wherein the first request includes a bookmark specifying a particular point in an output of the streamed content item corresponding to a point at which streaming of the content item was paused at the first client; and
a second client having one or more modules that are executable thereon to perform operations comprising:
forming a second request in response to the first request, wherein the second request is for communication to the head end to redirect the streamed content item to the second client and includes the bookmark;
receiving, by the second client, a temporary license from the head end that is supplied in response to the second request, for receipt of the streamed content item from the head end, the temporary license includes a conditional access right to an initial portion of the streamed content item;
receiving the initial portion of the streamed content item from over the network in response to the second request for output at the particular point in the streamed content item as specified by the bookmark; and
during receiving of the initial portion of the streamed content item based on the temporary license, receiving, by the second client, from the head end, a regular license to receive a remaining portion of the streamed content item for output by the second client.

32. A system as described in claim 31, wherein the one or more modules are executable on the first client to communicate the first request to the head end such that the head end then communicates the first request to the second client.

33. A system as described in claim 31, wherein the one or more modules are executable on the first client to communicate the first request to the second client without utilizing the head end.

34. A system as described in claim 31, wherein the initial portion of the streamed content item is received from the head end at the second client and at least partially output for viewing by a viewer according to the temporary license supplied in response to the second request prior to the second client receiving the regular license.

35. A system as described in claim 31, wherein:
following receipt of the temporary license, the second client sends a response and a token to the first client, the token having been received by the second client from the head end; and
following receipt of the response and the token from the second client, the first client sends a digital rights transfer request to the head end including the response and the token from the second client for use in obtaining the regular license for the second client, wherein the token is used to authenticate the response from the second client.

36. A system as described in claim 31, wherein the one or more modules of the second client are further executable to receive a regular license from the head end that includes a conditional access right based at least in part on a regular license to the streaming content item for the first client.

37. A system as described in claim 31, wherein the regular license is supplied to the second client for a fee assessed by the head end.

38. A system as described in claim 31, wherein the one or more modules of the second client are further executable to receive the regular license from the head end that includes a conditional access right that is not included in the temporary license.

39. A system as described in claim 32, wherein the streaming content item is on-demand content.

\* \* \* \* \*